Patented Oct. 10, 1922.

1,431,156

UNITED STATES PATENT OFFICE.

WILLIAM ARTHUR GEERE, OF HERNE HILL, LONDON, AND ERNEST WALTER GEERE, OF UPPER NORWOOD, LONDON, ENGLAND.

COMPOSITION OF MATTER FOR INCREASING GROWTH OF YEAST WHEN MIXED WITH DOUGH.

No Drawing.     Application filed February 23, 1921.   Serial No. 447,250.

*To all whom it may concern:*

Be it known that WILLIAM ARTHUR GEERE, a subject of the King of Great Britain and Ireland, residing at 9 Elfindale Road, Herne Hill, London, S. E. 24., and ERNEST WALTER GEERE, a subject of the King of Great Britain and Ireland, residing at 8 Tudor Road, Upper Norwood, S. E. 19, London, England, and 85 New Oxford Street, London, W. C. 1., England, have invented a composition of Matter for Increasing Growth of Yeast When Mixed with Dough (for which I have filed an application in England August 4, 1917, Patent No. 143,938), of which the following is a specification.

This invention relates to the manufacture of improved foods or stimulants for promoting the growth of yeast after it has been mixed with other ingredients to form dough.

The object of this invention is to provide a food or stimulant for yeast, which when mixed with the yeast and other ingredients employed in making dough, will cause a greater increase in the growth of the yeast during the period of fermentation. This object being attained, it follows that a much smaller quantity of yeast can be employed in making the dough.

It has been proposed heretofore, to employ germ of cereals as a food or stimulant for yeast used in brewing: and to combine it, and other ingredients, with flour, for making bread, biscuits, pastry and the like. In all such cases however, the germ of the cereal is subjected to a heating process, at a high temperature, before it is mixed with the yeast.

We have found that it is essential to retain the life or active properties, residing in such germ if it is to be capable of promoting growth of the yeast, during fermentation. We have also found that this "life" is entirely destroyed if the germ is subjected to a heating process, before being mixed with the yeast.

The invention consists in mixing or combining the germ of a cereal, such as wheat, barley, oats, maize, dari or the like—which has not been submitted to a heating process, and in which, therefore, the enzymes have not been injured or destroyed—with ammonium carbonate, a phosphate, a starch, and a certain proportion of a cereal meal. The phosphate employed will be, preferably, one of the following: ammonium phosphate, hydrogen disodium phosphate, monobasic phosphate of soda or dihydrogen sodium phosphate. The ingredients are mixed or combined in a dry state.

The approximate proportions of such ingredients is shown in the following formula, which is given as an example:—

| | Per cent. |
|---|---|
| Germ of wheat, or other cereal germ | 60 |
| Starch | 10 |
| Ammonia carbonate $(NH_4)_2CO_3$ | 1 |
| Cereal meal | 26 |
| Sodium phosphate, or other suitable phosphate as hereinbefore described | 3 |

It is known that the yeast contained in the dough produces buds and new cells and thereby increases in quantity during the period between the mixing of the dough and the baking thereof. The addition of a stimulant or food made in accordance with our invention causes a much greater increase in the number of buds and cells produced by the yeast as will be seen by the following comparison. This comparison was made by counting the growth in a four hour dough with a $\frac{1}{400}$ millimeter chamber. 3½ oz. of yeast mixed into dough without any food or stimulant, contained 96 cells, 10 buds. After being allowed to work, or ferment, for four hours it was found to contain 134 cells, 35 buds, showing an increase of 38 cells, 25 buds.

1½ oz. of yeast in a dough to which had been added 14 drachms of yeast food or stimulant made in accordance with this invention, contained 65 cells, 6 buds. After working or fermenting for four hours it was found to contain 138 cells, 53 buds, showing an increase of 73 cells, 47 buds.

Claims:—

1. The herein described composition of matter for increasing growth of yeast when mixed with dough, consisting of the germ of a cereal which has not been submitted to heat, ammonium carbonate, a phosphate, a starch and cereal meal.

2. The herein described composition of matter for increasing growth of yeast when mixed with dough, consisting of 60 parts of the germ of a cereal which has not been submitted to heat, 1 part ammonium carbonate, 3 parts of a phosphate, 10 parts of a starch and 26 parts of cereal meal.

In testimony whereof we affix our signatures in presence of two witnesses.

WILLIAM ARTHUR GEERE.
ERNEST WALTER GEERE.

Witnesses:
H. C. FOSTER,
S. A. ROGERS.